April 22, 1930.  A. E. HANSEN  1,755,735
STANDPIPE CONNECTION
Filed Feb. 2, 1928  2 Sheets-Sheet 1
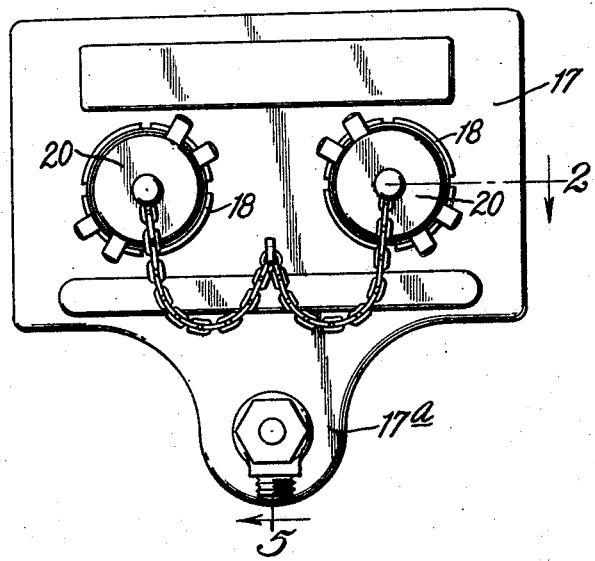
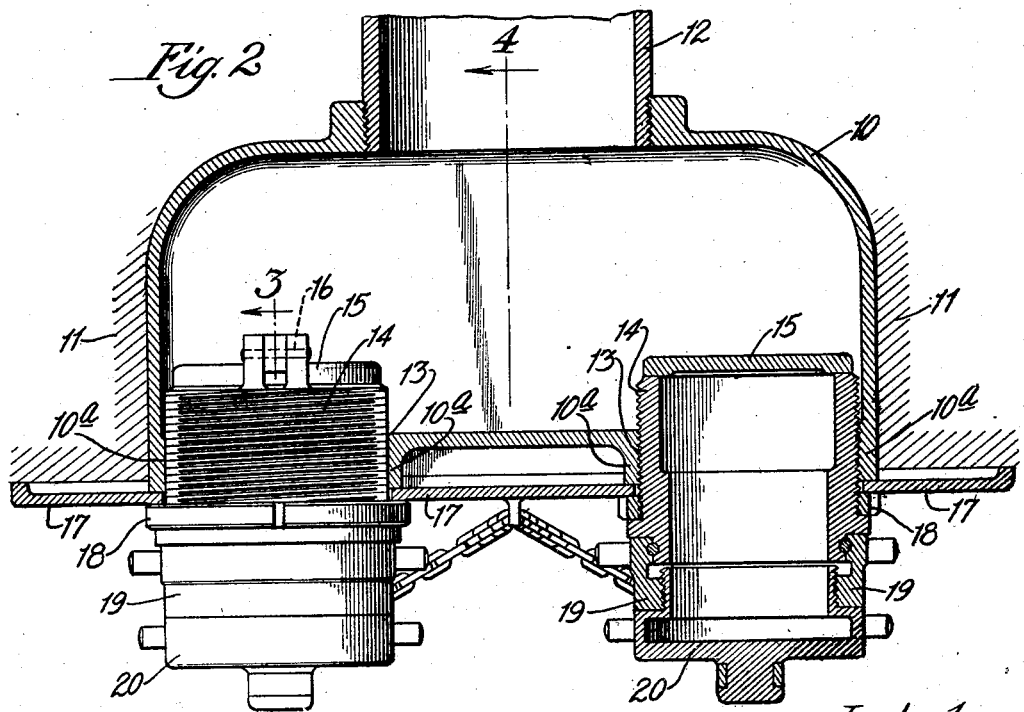

April 22, 1930. A. E. HANSEN 1,755,735
STANDPIPE CONNECTION
Filed Feb. 2, 1928 2 Sheets-Sheet 2
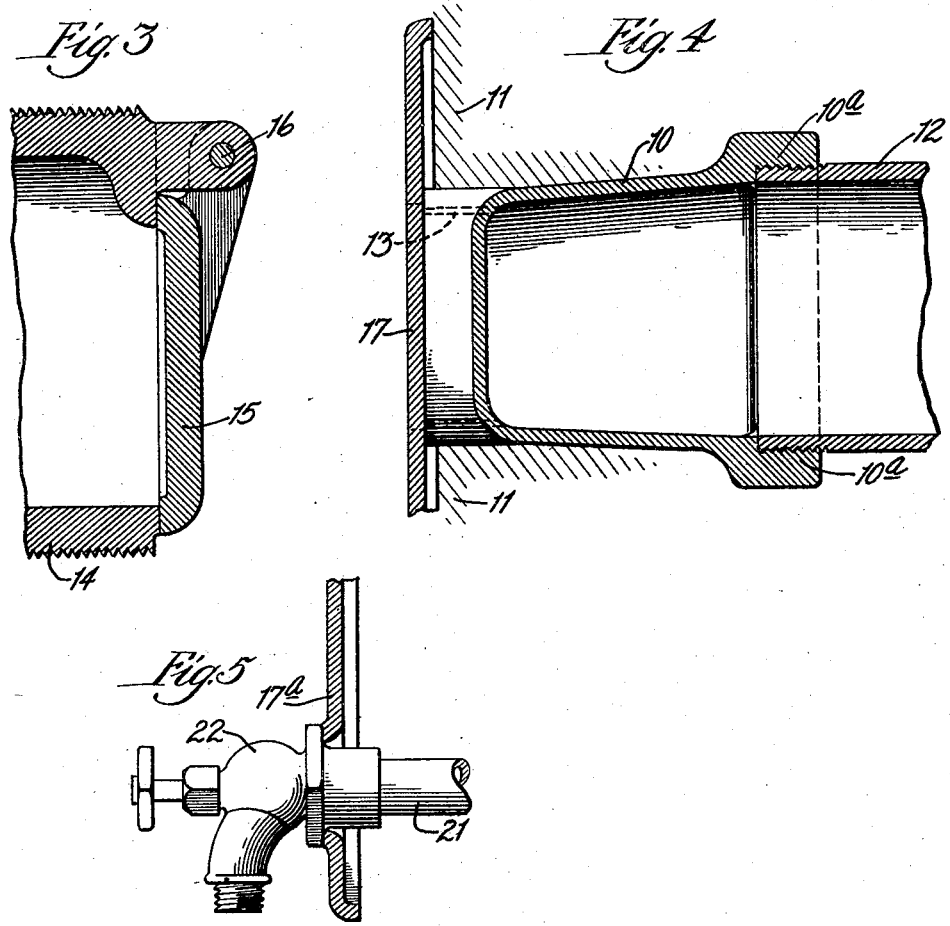

Patented Apr. 22, 1930

1,755,735

UNITED STATES PATENT OFFICE

ALBERT E. HANSEN, OF ELKHART, INDIANA, ASSIGNOR TO ELKHART BRASS MANUFACTURING COMPANY, A CORPORATION OF INDIANA

STANDPIPE CONNECTION

Application filed February 2, 1928. Serial No. 251,296.

This invention relates to improvements in standpipe connections, and more especially such a connection known as a Siamese, permitting the attachment of two hoses.

My improved standpipe connection is especially adapted for use in connection with firefighting installations. Buildings, especially high ones, frequently are provided with fire extinguishing systems, a connection being provided at one of the outer walls for attaching a hose from a fire engine in order to permit such engine to increase the pressure or supply of the water inside. My improved invention relates to a standpipe connection of this kind permitting the attachment of two hoses.

One of the features of my invention is the provision of such a standpipe connection that projects only a short distance from the outside of the building in which it is installed. This is an advantage especially in metropolitan areas where the outer wall of the building is frequently flush with the edge of the sidewalk. If the standpipe connection projects an undue distance over the sidewalk there is danger of injury to pedestrians. My improved hose connection is so close to the building that there is little, if any, danger of the same being struck by passerby.

Another feature of my invention is the housing of the Y connection inside of the wall of the building itself, thus materially reducing the distance that the hose connections project beyond the outer surface of the wall. In connection with this feature, I provide clapper or check valves that form units with the nipples carrying the hose connections, each of such nipples with its check valve being readily removable from the Y piece from the outside of the building without disturbing the installation of the standpipe connection.

Other features and advantages of my invention will appear more fully as I proceed with my specification.

In that form of device embodying the features of my invention shown in the accompanying drawings, Figure 1 is a view in front elevation. Fig. 2 is a view taken as indicated by the line 2 of Fig. 1, Fig. 3 is a view taken as indicated by the line 3 of Fig. 2, Fig. 4 is a view taken as indicated by the line 4 of Fig. 2, and Fig. 5 is a view taken as indicated by the line 5 of Fig. 1.

As shown in the drawings, my improved standpipe connection comprises a Y body piece indicated by 10 which is adapted to be inserted in the wall 11 of the building preferably while such wall is in process of construction. The body piece 10 is provided on its inner face with a threaded hole adapted to receive the pipe 12 leading to the standpipe or other water piping in the building; and the outer face of the body part 10 is provided with two threaded openings 13 adapted to receive the nipples 14.

Each of the nipples 14 carries at its inner end a clapper or check valve 15 hinged at its upper edge as indicated by 16. The valve 15 is small enough to pass through the opening 13 when the nipple 14 is screwed out from the outside.

17 indicates a face plate provided with holes registering with the holes 13 through which the nipples 14 are inserted. The face plate 17 is here shown substantially rectangular in shape with a depending centrally arranged tongue 17ª; but it is obvious that this plate may be made of any suitable shape and bear any suitable design or configuration. For example, it may contain directions as to pressure, connections and the like.

Each of the nipples 14 is provided with a threaded locking spring or collar 18 adapted to be screwed against the face plate 17 to lock the same against the flange 10ª on the body part 10 surrounding the hole 13. When tightened up, the locking collar 18 serves to hold the face plate in position and also serves to hold the nipple tightly in place.

The outer end of each of the nipples 14 is provided with the usual internally threaded swivel 19 for attachment to a hose. 20 indicates the customary cap to prevent the entrance of foreign matter.

In Fig. 5 there is shown projecting through the depending tongue 17ª a water supply pipe 21 having on its outer end the usual faucet 22.

In installing the standpipe connection the body part 10 is preferably put in the wall during the building. After the building is entirely completed the face plate 17 is then put into position, the nipples 14 with the valves 15 inserted and the locking collars 18 tightened up. When installed this way the nipples and valves are free from injury during the building operation. Also, the body part 10 is comparatively simple, rugged and cheap in construction so that there is little danger of damage to the same during the building of the wall. Also, if lost or stolen, the loss is relatively slight.

By using a face plate 17 which is installed the last thing, the joint between the connection and the masonry work of the wall is entirely concealed.

While I have shown and described certain embodiments of my invention, it is to be understood that it is capable of many modifications. Changes, therefore, in the construction and arrangement may be made without departing from the spirit and scope of the invention disclosed in the appended claims, in which it is my intention to claim all novelty in my invention as broadly as possible in view of the prior art.

What I claim is new, and desire to secure by Letters Patent, is:

1. A connection of the character described comprising; a body piece adapted to be built into a wall and having an opening adapted to receive a pipe connection from the building, the outer side of said body piece adapted to lie substantially flush with the outer surface of said wall and provided with a plurality of threaded openings; a face plate provided with a plurality of holes registering with said last mentioned openings, said face plate provided with a marginal flange adapted to lie outside of said wall and cover the edge of the wall adjacent said body piece; nipples with external threads inserted through the holes in the face plate and screwed into the threaded openings in the outer side of the body piece; and means for holding the face plate against the wall of the building, said means comprising locking rings threaded on the nipples and screwed against the face plate to engage the marginal edges surrounding the holes in said face plate.

2. A connection of the character described comprising; a body piece adapted to be built into a wall of a building, said body piece having an opening adapted to receive a pipe connection from the building, the outer side of said body piece adapted to lie substantially flush with the outer surface of said wall and provided with a plurality of threaded openings therein, each of said threaded openings being surrounded by an outwardly projecting flange; a face plate provided with holes registering with the openings in the outer side of the body piece, said face plate adapted to lie outside of said wall and provided with a marginal flange adapted to cover the edge of the wall adjacent said body piece; nipples with external threads inserted through the holes in said face plate and screwed into the threaded openings in the outer side of the body piece; and means for holding said face plate in position against the outer surface of said wall, said means comprising locking rings threaded on said nipples and screwed against the marginal edge of the face plate surrounding the holes therein to grip said face plate between said locking rings and the flanges surrounding the openings in the outer side of the body piece.

3. In combination with a wall of a building; a body piece built into said wall, said body piece having an opening adapted to receive a pipe connection from the building, and a plurality of threaded openings in its outer side accessible from the outside of the building; a face plate provided with holes registering with said last mentioned holes, said face plate lying outside the wall of the building and having a marginal edge extending over the edge of the wall adjacent the body piece; nipples with external threads inserted through the holes in the face plate and screwed into the threaded openings in the outer side of the body piece; and locking rings on said nipples lying outside of the face plate and screwed against the marginal edges of said face plate surrounding the openings therein to hold said face plate in position against said wall.

In witness whereof, I have hereunto set my hand this 30th day of January, 1928.

ALBERT E. HANSEN.